Sept. 17, 1963  F. J. CALLAHAN, JR  3,104,090
DIAPHRAGM VALVE
Filed March 7, 1960
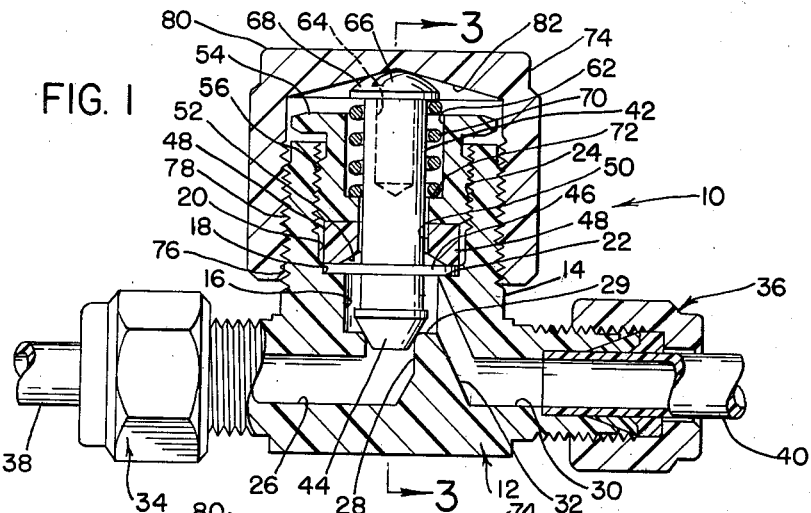
FIG. 1
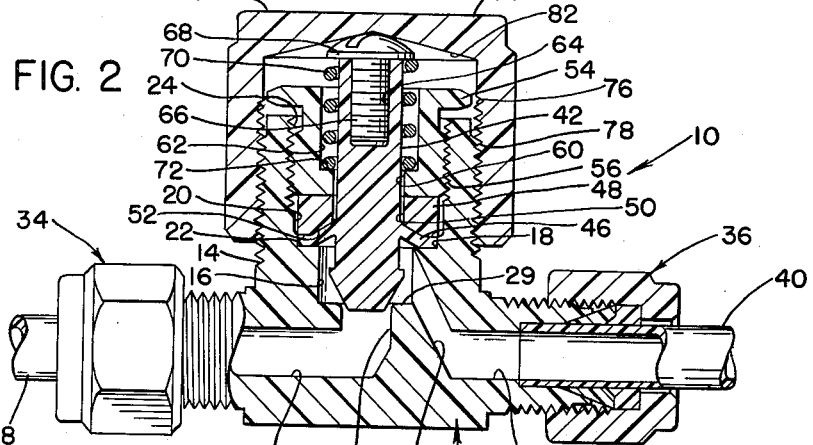
FIG. 2
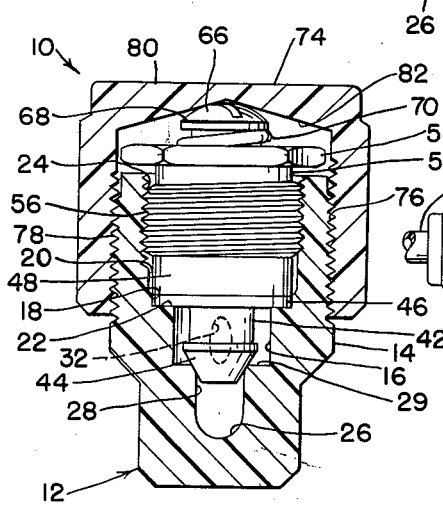
FIG. 3
FIG. 4
FIG. 5
INVENTOR.
FRANCIS J. CALLAHAN, JR.
BY
Fay & Fay
ATTORNEYS

United States Patent Office 3,104,090
Patented Sept. 17, 1963

3,104,090
DIAPHRAGM VALVE
Francis Joseph Callahan, Jr., Chagrin Falls, Ohio, assignor to Nuclear Products Company, Cleveland, Ohio, a corporation of Ohio
Filed Mar. 7, 1960, Ser. No. 13,307
2 Claims. (Cl. 251—278)

This invention relates to diaphragm valves of the type particularly useful in connection with the regulation of flow in vacuum systems.

Certain of the inventive concepts here involved are of special significance when employed in valves constructed substantially from resinous materials, but are also well adapted for utilization with valves fabricated largely from metal.

A number of factors have given rise to a recent marked trend in the valve industry towards the development and sale of valves fabricated largely from resinous materials. Metal shortages, economical considerations and favorable properties of a number of the newly discovered resins have led to the conclusion that valves of the type described have much to recommend them.

Strong support, both in and out of the industry, has been given to the proposition that resinous valving devices should contain as little metal as possible with the desired end being the complete elimination of metal in such valves. This view is probably due, at least in part, to the fact that because of the very fine corrosion-resistant qualities of resins in general, valves having such resins as a basic constituent have found increasing application in systems transporting corrosive fluids. As a result, it has been necessary for the valve industry to abandon many of the time-honored design concepts when developing valve devices for construction from resins.

One practice, strongly entrenched, has been the use of bellows for sealing and stem biasing purposes. Bellows satisfactory for such purposes are, of course, generally constructed of metal and, for this reason, are not well-adapted for use in resinous valves. As a result, the tendency has been towards the utilization of diaphragms, at least in connection with sealing functions.

The use of diaphragms in itself has given rise to a number of perplexing problems. Since in most instances diaphragms are mounted upon the valve stem by means of screw threads, clamping nuts or the like, it has been difficult to provide satisfactory insurance against the leakage of fluids between the stem and the diaphragm. In addition, the methods previously in use for mounting the diaphragm to the stem of the valve have not been satisfactory because of complexity and resultant high costs of production and maintenance.

Normally, in vacuum-type valves diaphragms have been used for the purpose of closing a fluid port by exerting a force against the port from above. This has not been at all satisfactory, inasmuch as atmospheric pressure frequently interferes with the proper operation of the diaphragm to prevent the valve from opening.

In view of the considerations outlined above, it is a general object of this invention to provide a valve which is particularly well suited for construction largely from resinous materials.

It is a further object of the invention to provide a valve of the type descriped which employs a diaphragm mounted on the valve stem in leak-proof relationship therewith.

It is a further object of the invention to provide a valve of the type described which includes a flexible diaphragm mounted on the valve stem in integral association therewith.

It is a further object of the invention to provide, in a valve employing a flexible diaphragm, control means to limit the flexing of the diaphragm.

It is a further object of the invention to provide a one piece valve stem and diaphragm combination.

It is a further object of the invention to provide a valve of the diaphragm type, suitable for use in vacuum systems, and which is so constructed as to prevent the interference of atmospheric pressure with the efficient operation of the valve.

Further objects of the invention will be apparent from the detailed description to follow.

This invention contemplates a vacuum valve which is particularly adapted for fabrication from resinous materials and which includes a flexible diaphragm integrally associated with a spring-biased valve stem. A back-up ring member provides for controlling or limiting the travel of the valve stem through abutment of the diaphragm therewith to prevent the diaphragm from being sheared away from the stem.

In the drawings:

FIG. 1 is a view partly in longitudinal section of a valve embodying the invention and showing the stem operative to seal off fluid flow therethrough;

FIG. 2 is a view similar to FIG. 1, but showing the stem in a position to allow fluid to pass through the valve;

FIG. 3 is a cross-sectional view of the valve taken along line 3—3 of FIG. 1;

FIG. 4 is a side elevation of the valve in reduced scale; and

FIG. 5 is an end view, also in reduced scale, of the valve of FIG. 4.

Referring now more particularly to the drawings, the invention has been shown as being embodied in a valve 10, which includes a generally T-shaped housing 12. The portion 14 of the housing 12 forming the leg of the T is provided with a bore 16 having co-axially aligned therewith a pair of counterbores 18 and 20.

As will be observed, the counterbore 18 is somewhat larger in diameter than the bore 16 and is joined thereto by means of a radially extending shoulder 22. In similar manner, the counterbore 20 is larger in diameter than the counterbore 18 and is provided over a portion of its length with suitable internal coupling means, such as, for example, threads 24.

The left hand portion of that part of the housing forming the cross arm of the T, as seen in FIGS. 1 and 2, is provided with a generally L-shaped fluid passageway 26 having its inner end portion 28 turned upwardly at approximately right angles so as to be joined to the inner end of the bore 16 by means of a radially extending shoulder 29. In similar fashion, the right hand portion of the cross piece is formed with a fluid passageway 30, having its inner end portion 32 angled upwardly to join the bore 16 above the shoulder 29. Suitable connectors 34 and 36 are provided on the ends of the cross piece portion of the T-shaped housing 14 for attaching the valve 10 in fluid communicating relationship with lines 38 and 40.

Received in co-axially aligned relationship within the bores 16, 18 and 20 is an elongated stem 42 having at its inner end a generally frusto-conical nose portion 44 disposed in opposed relationship to the portion 28 of the fluid passageway 26.

The smallest diameter of the nose portion 44 is somewhat smaller than the diameter of the portion 28 of the fluid passageway 26, and the largest diameter somewhat larger than such portion. This construction provides, when the the valve is in closed position, as seen in FIG. 1, a substantially line contact sealing relationship between the portion 28 of the fluid passageway 26 and the frusto-conical nose portion 44 of the stem 42.

Intermediate the ends of the stem 42 is positioned a thin, flexible, annular diaphragm 46 integrally associated therewith and extending radially outwardly therefrom.

As will be observed, the spacing of the diaphragm from the nose portion 44 of the stem is such that when the nose is seated against the line of intersection between portion 28 of the fluid passageway 26 and radial shoulder 29, the diaphragm lies substantially flush with radial shoulder 22. An annular back-up ring 48 provided with a central aperture 50 is received around the stem 42 adjacent the diaphragm 46 and fits into the bore 20. The back-up ring 48 has an outside diameter substantially equal to the diameter of the diaphragm 46, and the central aperture 50 of the ring is provided with a flared or countersunk mouth 52 adjacent the diaphragm. Very good performance characteristics have been found to result when the largest diameter of the mouth 52 is about equal to half the difference between the inner and outer diameters of the back-up ring.

The illustrated relationship between the diaphragm 46, the back-up ring 48 and the radial shoulder 22 is particularly advantageous in a miniaturized valve of this type. By assuming the diaphragm 46 is unflexed when the stem is at its lowest point of travel, FIG. 1, the shoulder 22 may be of a size such that it abuts a substantial area of the lower surface of the diaphragm. This covering effect of the shoulder 22 eliminates undesirable fluid pressures on the lower side of the diaphragm. However, to assure the proper flexure of the diaphragm as the stem is moved upward, a relatively smaller area of the upper surface of the diaphragm 46 is normally in contact with the back-up ring 48.

A gland nut 54 is provided with external thread means or the like 56 for co-operation with internal threads 24 in the bore 20. Suitable wrench engaging means, such as tool pads 58, may be provided upon the gland nut in order to allow the same to be advanced inwardly by means of the threads 24 and 56, thereby to clamp firmly the diaphragm 46 against the shoulder 22 and the back-up ring 48 against the diaphragm 46.

The gland nut is provided with a central bore 60 having co-axially aligned therewith a counterbore 62 of a larger diameter than the bore. The stem 42 extends through the bore 60 and counterbore 62 in co-axially aligned relationship therewith. When the valve components are assembled, the stem 42 extends for a short distance above the outer end of the gland nut 54 and is provided at its outer end portion with a threaded bore 64 extending axially therealong and adapted to receive a cap screw or the like 66. The head 68 of the cap screw is somewhat larger in diameter than the diameter of the stem 42. Suitable compression spring means 70 is received around the stem 42 and is seated at its inner end against the radial shoulder 72 interconnecting the bore 60 and counter bore 62, and at its outer end against the head 68 of the cap screw 66. It is believed apparent that the compressive force asserted by the spring 70 may be varied by a simple adjustment of the cap screw 64.

An operating cap 74 provided with internal threads or the like 76 for co-operating engagement with threads 78 is received on the portion 14 of the housing 12. The end wall 80 of the cap is provided with a generally conical surface 82 having its axis generally co-extensive with the axes of the stem 42 and cap screw 68. Knurling or the like 84 may, if desired, be provided on the external surface of the cap 74 to increase the ease with which the same may be rotated for operation of the valve.

Experimentation has indicated that good results are obtained when the stem and diaphragm are made from "Teflon" or polyethylene, with "Teflon" being preferred. These materials are sufficiently rigid in heavier sections to function well when fabricated into valve stems, but at the same time are flexible enough in thinner sections to be possessed of those qualities necessary for efficient operation when fabricated into diaphragms. These characteristics are here of necessity indispensable, since the valve stem is constructed with diaphragm integrally associated therewith.

The invention described hereinabove is particularly adapted for use in connection with vacuum valves and a valve constructed in accordance with the teachings of the invention is efficient and positive in operation. When the valve is in closed position, as seen in FIG. 1, the nose portion 44 of the stem 42 is tightly seated against the line of intersection between the radial shoulder 29 and the upwardly turned portion 28 of the fluid passageway 26 to prevent thereby the flow of fluids through the valve. This sealed, seated relationship between the nose portion of the stem and the line of intersection is maintained by means of the engagement between the conical surface 82 of the end wall 80 of the operating cap 74 with the cap screw 68.

When it is desired to open the valve, the operating cap 74 is backed off along the threads 78 provided on the portion 14 of the housing. This operation moves the conical surface 82 of the wall 80 of the cap in a direction away from the gland nut 54, and allows the compression spring 70 to elongate, as seen in FIG. 2. The elongation of the spring causes the stem 42 to be biased along its axis in a direction away from the line of intersection between the radial shoulder 29 and the upwardly turned portion 28 of the fluid passageway 26. The diaphragm 46, by reason of its inherent flexibility, allows movement of the stem 42 until such time as abutment takes place between the diaphragm and the flared or counter sunk portion 52 of the bore 60 provided in the annular back-up ring 48. Thus, the back-up ring, through its abutment with the diaphragm, limits the travel of the stem 42 thereby to prevent such over-flexing of the diaphragm as might otherwise cause it to fail in shear. Under most circumstances, a stem travel of about $1/16$ inch has been found to be quite satisfactory for the purposes of efficient valve operation.

To close the valve, the cap is rotated in the reverse direction, thereby forcing the nose portion 44 again into seating engagement with the line of intersection between the radial shoulder 29 and the portion 28 of the fluid passageway 26, at which time the diaphragm resumes its normal unstressed shape, as seen in FIG. 1.

It will be observed that by providing a diaphragm which is integrally associated with the stem, I have been able to eliminate many of the problems which are ordinarily attendant to the use of diaphragms in connection with valving devices. The basic function of the diaphragm is, of course, to prevent the leakage of fluids passing through the valve outwardly around the stem and into the region of the spring biasing means. A diaphragm which is integrally associated with the stem eliminates one of the leakage paths which is present in installations where diaphragms not integrally associated with the stem are employed. Where a valve including the teachings of the invention is employed, the only potential leakage path for fluids is to be found at the peripheral edge of the diaphragm. Leakage through this path may be prevented, however, by insuring the fact during assembly that the gland 54 is sufficiently engaged with screw threads 24 to insure a tight clamping of the diaphragm 46 against the radial shoulder 22 by downward pressure exerted by periphery of gland 48.

By reason of the fact that the stem 42, when operative to close the valve, is driven by the operating cap 74, no opportunity is presented for interference by atmospheric pressure with the efficient and positive operation of the valve. The force exerted by the spring means 70 in opening the valve is, of course, more than adequate to prevent interference of atmospheric pressure with the operation of the valve in this respect.

For purposes of illustration, certain terminology and certain concrete embodiments have been employed in the description of the inventive principles here involved. It will be immediately obvious, however, to one possessing but ordinary skill in the art that a number of departures could be made with respect to the terminology and illustrative embodiments employed without, at the same time, departing from the true scope of the invention. It is not my intention, therefore, to be limited by the specific illustrative embodiments shown or the descriptive terminology employed, but only by the scope of the appended claims.

I claim:

1. In a valve device, a resinous housing, a fluid passageway in the housing, a seat intermediate the ends of the passageway, an elongated resinous stem reciprocally mounted in the housing and having one end portion opposed to the seat, the one end portion adapted in one position of the stem sealingly to engage the seat and in another position of the stem to define a spaced relationship with the seat thereby to regulate fluid flow through the valve, a generally circular flexible resinous diaphragm having a one-piece construction with the stem, the diaphragm being positioned intermediate the ends of the stem and extending radially outwardly therefrom, means clamping the margins of the diaphragm tightly within the housing, said means including an annular shoulder in the housing against which the marginal portion of one face of the diaphragm is seated, a back-up ring received on the stem and positioned adjacent the opposite face of the diaphragm, the back-up ring being provided with an annular flared cavity, opposed to the radially inner portion of the diaphragm for removably receiving such portion when the diaphragm is flexed, a gland nut threadedly received in the housing and carried on the stem adjacent the back-up ring and clamping the same tightly against the diaphragm and the diaphragm in turn tightly against the annular shoulder, said gland nut having a cavity portion, said stem having screw means adjustably carried at the other end thereof, spring means disposed in said cavity portion of said gland nut and abutting said screw means an operating cap enveloping and abutting the screw means and threadedly engaged with the housing, whereby rotation of the cap may be employed to force the stem toward the seat against the biasing force of the spring means.

2. In a valve device, a resinous housing having a fluid passageway extending therethrough, a valve seat intermediate the ends of said passageway, said housing having a bore extending coaxially with the valve seat, said bore having a radial shoulder facing away from said seat, the bore having threads axially spaced from said shoulder, a one piece resinous stem and radially extending diaphragm movably mounted in said bore so that in one position of said stem and diaphragm one end of said stem abuts said seat with the lower outer periphery of the integral radial diaphragm freely engaging said radial shoulder, a gland nut threaded into said threaded bore, a back-up ring telescopically received over said stem and interposed between said gland nut and said diaphragm, said back-up ring having a flared cavity facing the valve seat with the outer edge thereof abutting the upper outer periphery of the diaphragm to thereby clamp the diaphragm against said shoulder, the area of engagement between said diaphragm and said shoulder being greater than the area of engagement between said ring and said diaphragm when the stem and diaphragm are in said one position, thus to substantially eliminate fluid pressure on the lower peripheral surface of the diaphragm when said stem and diaphragm are in said one position, and means to reciprocate said stem, whereby the inner portion of the flared cavity of said back-up ring is alternately engaged and disengaged by the diaphragm when said stem is moved away from and toward said seat, respectively.

References Cited in the file of this patent

UNITED STATES PATENTS

| | | |
|---|---|---|
| 745,027 | Stone | Nov. 24, 1903 |
| 877,875 | Nostran | Jan. 28, 1908 |
| 1,605,765 | Papin | Nov. 2, 1926 |
| 2,605,991 | Kaye | Aug. 5, 1952 |
| 2,675,204 | Johnson | Apr. 13, 1954 |
| 2,734,773 | Ivins | Feb. 14, 1956 |
| 2,757,898 | Cox | Aug. 7, 1956 |
| 2,768,643 | Acomb | Oct. 30, 1956 |
| 3,034,761 | Janquart | May 15, 1962 |